(12) United States Patent
Caiozza

(10) Patent No.: US 6,649,049 B1
(45) Date of Patent: Nov. 18, 2003

(54) MAGNETICALLY ENHANCED OIL FILTER APPARATUS

(76) Inventor: Joseph C. Caiozza, 321 W. Market St., Long Beach, NY (US) 11561

( * ) Notice: Subject to any disclaimer, the term of this patent is extended or adjusted under 35 U.S.C. 154(b) by 0 days.

(21) Appl. No.: 10/267,452

(22) Filed: Oct. 9, 2002

(51) Int. Cl.[7] .............................................. B01D 35/06
(52) U.S. Cl. ........................ 210/186; 210/222; 210/223; 210/DIG. 17; 184/6.25
(58) Field of Search ............................... 210/222, 223, 210/695, 186, DIG. 17; 184/6.25; 335/302, 306

(56) References Cited

U.S. PATENT DOCUMENTS

| | | | |
|---|---|---|---|
| 5,510,024 A | * | 4/1996 | Caiozza ........................ 210/186 |
| 5,879,549 A | * | 3/1999 | Caiozza ........................ 210/223 |
| 6,426,000 B1 | * | 7/2002 | Caiozza ........................ 210/222 |
| 6,444,123 B1 | * | 9/2002 | Caiozza ........................ 210/223 |

* cited by examiner

Primary Examiner—David A. Reifsnyder

(57) ABSTRACT

A magnetically enhanced oil filter apparatus is provided for attachment to a cartridge mounting stem on an engine and includes a cartridge housing which includes an inside housing wall and an outside housing wall. A magnet unit is supported on a portion of the outside housing wall, and the magnet unit provides a magnetic flux field, a portion of which is present inside the cartridge housing which defines an internal magnetic flux field. A turbulence box support plate is supported inside the cartridge housing. The turbulence box support plate includes a box-reception notch. A filter unit is supported on the turbulence box support plate. A turbulence box is supported by the turbulence box support plate adjacent to a portion of the inside housing wall. The turbulence box is placed in registration with the box-reception notch and in registration with the internal magnetic flux field.

15 Claims, 3 Drawing Sheets

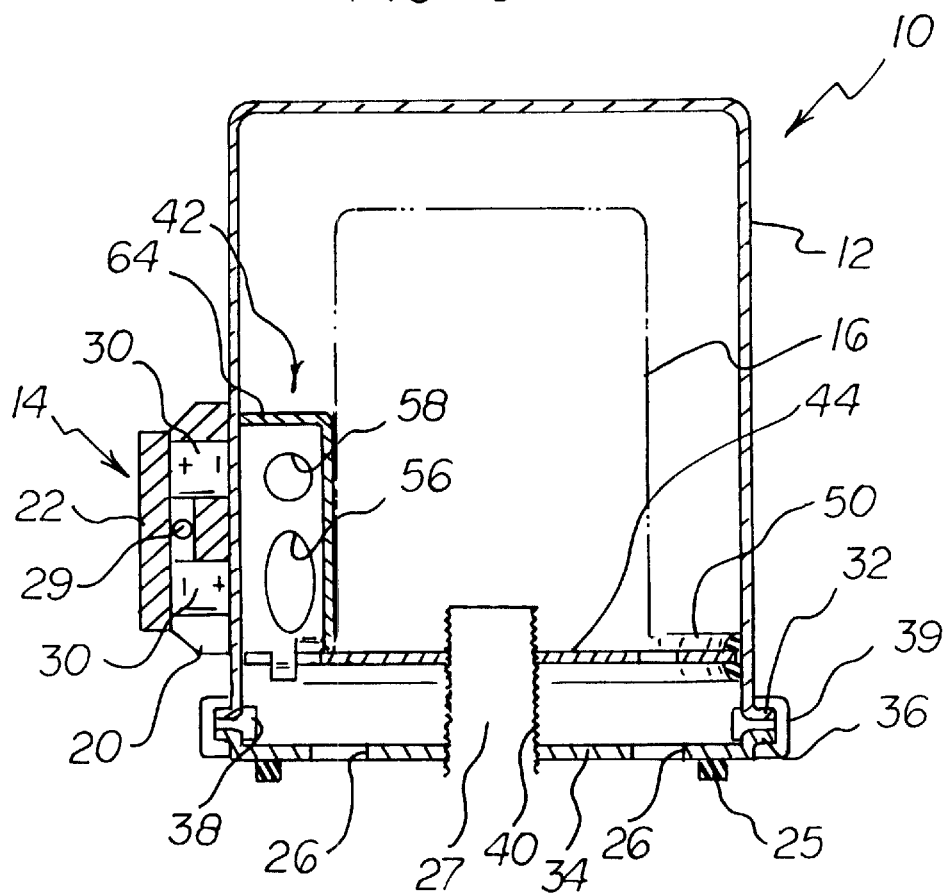
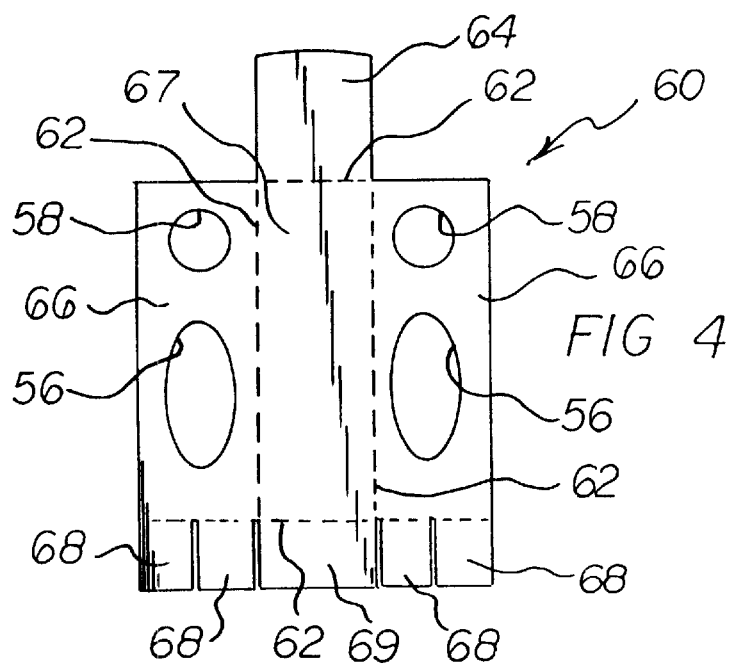

MAGNETICALLY ENHANCED OIL FILTER APPARATUS

BACKGROUND OF THE INVENTION

1. Field of the Invention

The present invention relates generally to oil filter devices and, more particularly, to oil filter devices mounted on motor vehicles.

2. Description of the Prior Art

The use of oil filtering devices for motor vehicles is known in the prior art. In my prior patent U.S. Pat. No. 5,510,024 there is disclosed a magnet assembly or attachment for magnetically collecting metallic particles within an oil filter cartridge. That inventive device includes a pair of magnets supported in a spaced relationship by a carrier which latter is positionable along an exterior of a filter cartridge. The carrier serves an additional function of a heat sink. A shunt couples opposite poles of the magnets together to increase the magnetic flux directed into the filter cartridge to separate and retain metallic particles from the filtered fluid.

An oil lubrication circuit of a motor vehicle includes a variety of components, and such components generally include a cartridge mounting stem for an oil filter cartridge, an oil output channel in the cartridge mounting stem for allowing filtered oil to exit from the oil filter cartridge and circulate in the oil lubrication circuit, and one or more oil input channels, present in the engine for channelling oil from the engine into the oil filter cartridge.

The interior of a conventional oil filter cartridge generally includes a centrally located filtered oil flow space and an array of filter material arrayed circumferentially around the centrally located filtered oil flow space. Inside the conventional oil filter cartridge, oil flows in a diffuse pattern radially from circumferential positions outside the filter material, through the filter material, and into the centrally located filtered oil flow space. It is noted that when the magnet attachment is used for a conventional oil filter cartridge, as disclosed in the abovementioned U.S. Pat. No. 5,510,024, only a relatively small portion of the oil flowing through the conventional oil filter cartridge is exposed to strong magnetic fields as the oil flows through the conventional oil filter cartridge. To increase the efficiency of a magnet attachment for an oil filter cartridge for trapping ferromagnetic particles and thereby separating the ferromagnetic particles from the flowing oil, it would be desirable if an oil filter cartridge were provided which directs a concentrated flow of oil inside the oil filter cartridge in the vicinity of a magnet attachment.

Other related patents of the present inventor include U.S. Pat. No. 5,879,549 and U.S. Pat. No. 6,426,000. In this respect, all of U.S. Pat. No. 5,510,024, U.S. Pat. No. 5,879,549, and U.S. Pat. No. 6,426,000 are incorporated herein by this reference.

Still other features would be desirable in a magnetically enhanced oil filter apparatus. For example, with an oil filter cartridge which has a magnet unit attached to an outside portion of the cartridge housing, if the magnet unit is firmly fixed to the oil filter cartridge when the oil filter cartridge is screwed onto an externally threaded cartridge mounting stem on an engine, in tight spaces, the magnet unit may prevent. proper installation of the oil filter cartridge onto the externally threaded cartridge mounting stem. Loosening of the magnet unit on the oil filter cartridge may solve this problem, but, if an oil flow director on the inside of the oil filter cartridge should be in registration with the external magnet unit, then loosening of the magnet unit may cause the internal flow director to be out of registration with the magnet unit. In this respect, it would be desirable if a magnetically enhanced oil filter apparatus were provided which enables an easy registration adjustment of an internal flow director with an external magnet unit.

With a magnetically enhanced oil filter apparatus, an important characteristic is the exposure of the oil flowing in the oil filter cartridge to the magnetic flux field exerted by the magnet unit on the flowing oil. In this respect, it would be desirable for a magnetically enhanced oil filter apparatus to include elements that increase the exposure of the oil flowing in the oil filter cartridge to the magnetic flux field exerted by the magnet unit on the flowing oil.

A smooth flow of oil in the vicinity of the magnetic flux field of a magnet unit causes the flowing oil to pass through the magnetic flux field at a relatively rapid rate. To increase the exposure of flowing oil to the magnetic flux field of a magnet unit, it would be desirable if the flow of the oil through the magnetic flux field were a turbulent flow.

Thus, while the foregoing indicates it to be well known to use a magnetically enhanced oil filter apparatus, the foregoing does not teach or suggest a magnetically enhanced oil filter apparatus which has the following combination of desirable features: (1) directs a concentrated flow of oil inside the oil filter cartridge in the vicinity of a magnet attachment; (2) enables an easy registration adjustment of an internal flow director with an external magnet unit; (3) include elements that increase the exposure of the oil flowing in the oil filter cartridge to the magnetic flux field exerted by the magnet unit on the flowing oil; and (4) causes a turbulent flow of the oil through the magnetic flux field exerted by a magnet unit. The foregoing desired characteristics are provided by the unique magnetically enhanced oil filter apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a magnetically enhanced oil filter apparatus for attachment to a cartridge mounting stem on an engine and includes a cartridge housing which includes an inside housing wall and an outside housing wall. A magnet unit is supported on a portion of the outside housing wall, and the magnet unit provides a magnetic flux field, a portion of which is present inside the cartridge housing which defines an internal magnetic flux field. A turbulence box support plate is supported inside the cartridge housing. The turbulence box support plate includes a box-reception notch. A filter unit is supported on the turbulence box support plate. A turbulence box is supported by the turbulence box support plate adjacent to a portion of the inside housing wall. The turbulence box is placed in registration with the box-reception notch and in registration with the internal magnetic flux field.

The magnet unit can include a heat sink portion, and cylindrical magnets are received in the heat sink portion. A magnet concentrator plate contacts the heat sink portion and is placed in registration with the cylindrical magnets. Unit-to-cartridge-housing connector means are connected to the heat sink portion, for connecting the magnet unit to the cartridge housing.

With one embodiment of the invention, the unit-to-cartridge-housing connector means can include first magnet unit mounting brackets attached to the outside housing wall. Second magnet unit mounting brackets includes bottom mounting tabs and top pin-reception portions. The mounting tabs are received in the first magnet unit mounting brackets, and a mounting pin threaded through the pin-reception portions. With another embodiment, the unit-to-cartridge-housing connector means can include a mounting strap for mounting the magnet unit on the cartridge housing.

Preferably, the turbulence box support plate is received in a support-plate-reception gasket which forms a partial seal between the turbulence box support plate and the inside housing wall. The support-plate-reception gasket includes a gasket gap which is in registration with the turbulence box. The turbulence box support plate is received in a plate-reception groove in the support-plate-reception gasket. The turbulence box support plate includes an internally threaded support-plate-stem-reception channel for attachment to an externally threaded cartridge mounting stem.

A housing mounting plate is connected to the cartridge housing. The housing mounting plate includes an internally threaded mounting-plate-stem-reception channel for attachment to the externally threaded cartridge mounting stem. The housing mounting plate includes cartridge oil input channel slots. The housing mounting plate can include a mounting plate lip, and the cartridge housing can include a housing bottom lip. A lip-to-lip gasket is provided between the mounting plate lip and the housing bottom lip. A lip-gasket-lip clamping member is provided for clamping the lip-to-lip gasket between the mounting plate lip and the housing bottom lip.

The turbulence box support plate includes adjustment-tool-reception notches which are in registration with the cartridge oil input channel slots.

The turbulence box includes box side wall panels connected to the turbulence box support plate along side the box-reception notch. A box roof panel is connected to top portions of the box side wall panels. The box side wall panels includes turbulence flow orifices. Preferably, the turbulence flow orifices include first turbulence flow orifices and second turbulence flow orifices. The second turbulence flow orifices are smaller than the first turbulence flow orifices. The turbulence flow orifices cause enhanced turbulent flow inside the turbulence box, such that oil is retained inside the turbulence box for a relatively long period of time.

Preferably, the cross-sectional area of the first turbulence flow orifices and the second turbulence flow orifices is substantially equal to the cross-sectional area of the cartridge mounting stem. In this way, excessive oil pressure is not built up inside the cartridge housing.

The turbulence box can be formed from a turbulence box blank includes a box roof panel. A rear wall panel is connected to the box roof panel at a fold line. A pair of box side wall panels are connected to the rear wall panel at a respective pair of fold lines, wherein each of the box side wall panels includes first turbulence flow orifices and second turbulence flow orifices. Box-to-plate connector means are connected to the box side wall panels and the rear wall panel, for connecting the turbulence box to the turbulence box support plate.

The box-to-plate connector means can include a pair of box locking side tabs connected to each box side wall panel at respective fold lines. A box locking rear tab is connected to the rear wall panel at a fold line.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved magnetically enhanced oil filter apparatus which has all of the advantages of the prior art and none of the disadvantages.

It is another object of the present invention to provide a new and improved magnetically enhanced oil filter apparatus which may be easily and efficiently manufactured and marketed.

It is a further object of the present invention to provide a new and improved magnetically enhanced oil filter apparatus which is of durable and reliable construction.

An even further object of the present invention is to provide a new and improved magnetically enhanced oil filter apparatus which is susceptible of a low cost of manufacture with regard to both materials and labor, and which accordingly is then susceptible of low prices of sale to the consuming public, thereby making such magnetically enhanced oil filter apparatus available to the buying public.

Still yet a further object of the present invention is to provide a new and improved magnetically enhanced oil filter apparatus which directs a concentrated flow of oil inside the oil filter cartridge in the vicinity of a magnet attachment.

Still another object of the present invention is to provide a new and improved magnetically enhanced oil filter apparatus that enables an easy registration adjustment of an internal flow director with an external magnet unit.

Yet another object of the present invention is to provide a new and improved magnetically enhanced oil filter apparatus which include elements that increase the exposure of the oil flowing in the oil filter cartridge to the magnetic flux field exerted by the magnet unit on the flowing oil.

Even another object of the present invention is to provide a new and improved magnetically enhanced oil filter apparatus that causes a turbulent flow of the oil through the magnetic flux field exerted by a magnet unit.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a cross-sectional view of the embodiment of the magnetically enhanced oil filter apparatus of FIG. 2 taken along line 3—3 thereof.

FIG. 4 is a top view of a blank used to form a turbulence box used in the preferred embodiment of the invention.

DESCRIPTION OF THE PREFERRED EMBODIMENT

Figure 1:
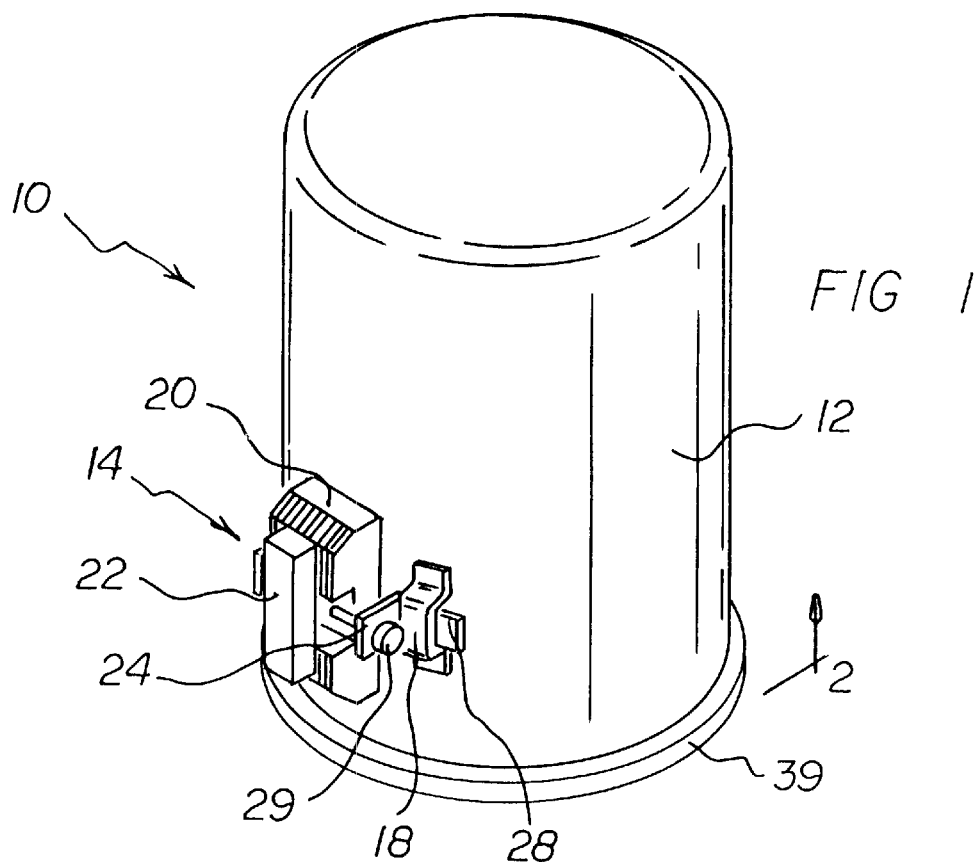
FIG. 1 is an elevated perspective view showing a preferred embodiment of the magnetically enhanced oil filter apparatus of the invention.

With reference to the drawings, a new and improved magnetically enhanced oil filter apparatus embodying the principles and concepts of the present invention will be described.

Turning to FIGS. 1–5, there is shown a preferred embodiment of the magnetically enhanced oil filter apparatus of the invention generally designated by reference numeral 10. In the preferred embodiment, the magnetically enhanced oil filter apparatus 10 is provided for attachment to a cartridge mounting stem 27 on an engine and includes a cartridge housing 12 which includes an inside housing wall and an outside housing wall. A magnet unit 14 is supported on a portion of the outside housing wall, and the magnet unit 14 provides a magnetic flux field, a portion of which is present inside the cartridge housing 12 which defines an internal magnetic flux field. A turbulence box support plate 44 is supported inside the cartridge housing 12. The turbulence box support plate 44 includes a box-reception notch 43. A filter unit 16 is supported on the turbulence box support plate 44. A turbulence box 42 is supported by the turbulence box support plate 44 adjacent to a portion of the inside housing wall. The turbulence box 42 is placed in registration with the box-reception notch 43 and in registration with the internal magnetic flux field.

With one embodiment of the magnet unit 14, the magnet unit 14 includes a heat sink portion 20, and cylindrical magnets 30 are received in the heat sink portion 20. A magnet concentrator plate 22 contacts the heat sink portion 20 and is placed in registration with the cylindrical magnets 30. Unit-to-cartridge-housing connector means are connected to the heat sink portion 20, for connecting the magnet unit 14 to the cartridge housing 12.

The unit-to-cartridge-housing connector means can include first magnet unit mounting brackets 18 attached to the outside housing wall. Second magnet unit mounting brackets includes bottom mounting tabs 28 and top pin-reception portions 24. The mounting tabs 28 are received in the first magnet unit mounting brackets 18, and a mounting pin 29 threaded through the pin-reception portions 24.

Alternatively, as discussed below, the unit-to-cartridge-housing connector means can include mounting straps such as disclosed in my above-mentioned U.S. Pat. No. 5,510,024, incorporated herein by reference.

The turbulence box support plate 44 is received in a support-plate-reception gasket 50 which forms a partial seal between the turbulence box support plate 44 and the inside housing wall. The support-plate-reception gasket 50 includes a gasket gap 54 which is in registration with the turbulence box 42. The turbulence box support plate 44 is received in a plate-reception groove 52 in the support-plate-reception gasket 50. The turbulence box support plate 44 includes an internally threaded support-plate-stem-reception channel 46 for attachment to an externally threaded cartridge mounting stem 27.

A housing mounting plate 34 is connected to the cartridge housing 12. The housing mounting plate 34 includes an internally threaded mounting-plate-stem-reception channel 40 for attachment to the externally threaded cartridge mounting stem 27. The housing mounting plate 34 includes cartridge oil input channel slots 26. The housing mounting plate 34 can include a mounting plate lip 36, and the cartridge housing 12 can include a housing bottom lip 32. A lip-to-lip gasket 38 is provided between the mounting plate lip 36 and the housing bottom lip 32. A lip-gasket-lip clamping member 39 is provided for clamping the lip-to-lip gasket 38 between the mounting plate lip 36 and the housing bottom lip 32.

The turbulence box support plate 44 includes adjustment-tool-reception notches 48 which are in registration with the cartridge oil input channel slots 26.

The turbulence box 42 includes box side wall panels 66 connected to the turbulence box support plate 44 along side the box-reception notch 43. A box roof panel 64 is connected to top portions of the box side wall panels 66. The box side wall panels 66 includes turbulence flow orifices. Preferably, the turbulence flow orifices include first turbulence flow orifices 56 and second turbulence flow orifices 58. The second turbulence flow orifices 58 are smaller than the first turbulence flow orifices 56. The turbulence flow orifices cause enhanced turbulent flow inside the turbulence box 42, such that oil is retained inside the turbulence box 42 for a relatively long period of time. The enhanced length of time of the oil in the turbulence box 42 permits greater attraction of the internal magnetic flux field for ferromagnetic particles in the oil and greater retention of such ferromagnetic particles on the inside housing wall near the magnet unit 14.

Preferably, the cross-sectional area of the first turbulence flow orifices 56 and the second turbulence flow orifices 58 is substantially equal to the cross-sectional area of the cartridge mounting stem 27. In this way, excessive oil pressure is not built up inside the cartridge housing 12.

The turbulence box 42 can be formed from a turbulence box blank 60 shown in FIG. 4. The turbulence box blank 60 includes a box roof panel 64. A rear wall panel 67 is connected to the box roof panel 64 at a fold line 62. A pair of box side wall panels 66 are connected to the rear wall panel 67 at a respective pair of fold lines 62, wherein each of the box side wall panels 66 includes first turbulence flow orifices 56 and second turbulence flow orifices 58. Box-to-plate connector means are connected to the box side wall panels 66 and the rear wall panel 67, for connecting the turbulence box 42 to the turbulence box support plate 44.

Figure 5:
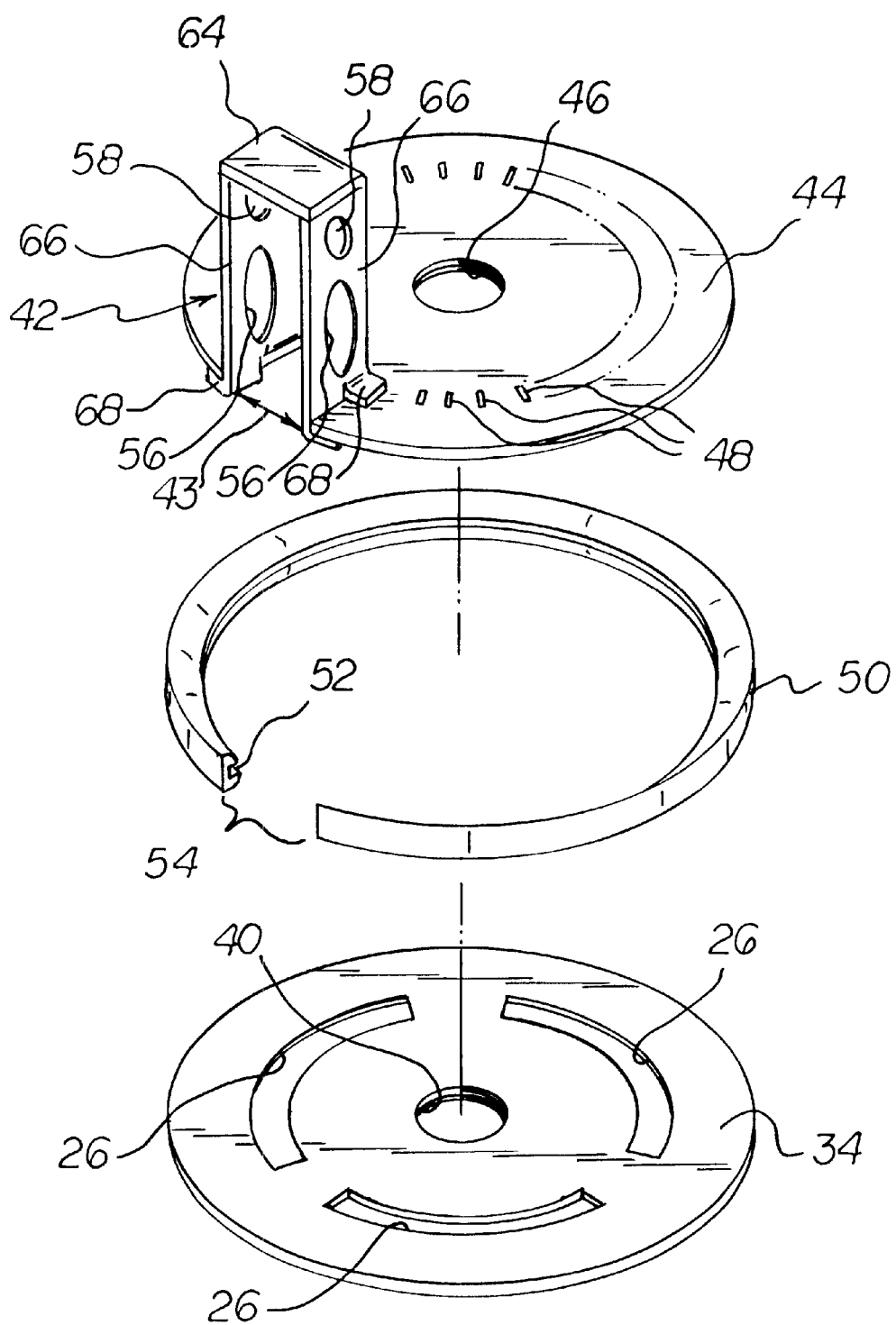
FIG. 5 is an exploded perspective view of portions of an adjustable turbulence box and associated elements.

The box-to-plate connector means can include a pair of box locking side tabs 68 connected to each box side wall panel 66 at respective fold lines 62. A box locking rear tab 69 is connected to the rear wall panel 67 at a fold line 62. The turbulence box 42 is formed from the turbulence box blank 60 by folding respective portions along respective fold lines 62. The formed turbulence box 42 is connected to the turbulence box support plate 44 at the box-reception notch 43 by folding the box locking side tabs 68 onto top and bottom portions of the turbulence box support plate 44 and by folding the box locking rear tab 69 under the turbulence box support plate 44, as shown in FIGS. 3 and 5.

In a first manner of use of the magnetically enhanced oil filter apparatus of the invention, the apparatus is assembled whereby, on the outside of the cartridge housing 12, the magnet unit 14 is connected to the cartridge housing 12 by employing the mounting pin 29, the pin-reception portions 24, and the mounting tabs 28 which are received in the first magnet unit mounting brackets 18. Inside the cartridge housing 12, the turbulence box 42 is placed in registration with the magnet unit 14. That is, the turbulence box 42 is placed in registration with the internal magnetic flux field provided by the magnet unit 14. The turbulence box 42 is retained in registration with the magnet unit 14 because the turbulence box support plate 44 is retained inside the cartridge housing 12 by a friction fit between the support-plate-reception gasket 50 and the inside housing wall. Once the turbulence box 42 has been placed in registration with the magnet unit 14, the lip-to-lip gasket 38 and the housing mounting plate 34 are fixed to the housing bottom lip 32 using the lip-gasket-lip clamping member 39. When this is done, the mounting-plate-stem-reception channel 40 and the support-plate-stem-reception channel 46 are in registration, as shown in FIG. 3.

Then, the magnetically enhanced oil filter apparatus 10 is mounted on the engine (not shown) by screwing the mounting-plate-stem-reception channel 40 and the support-plate-stem-reception channel 46 onto the cartridge mounting stem 27. A cartridge-to-block gasket 25 is located between the housing mounting plate 34 and the engine.

When mounted on the cartridge mounting stem 27, the magnetically enhanced oil filter apparatus 10 of the invention is ready for use. Oil is pumped by the engine oil pump (not shown) so that oil flows through the cartridge oil input channel slots 26. Oil then enters the bottom of the turbulence box 42 through the box-reception notch 43 in the turbulence box support plate 44. The internal magnetic flux field from the magnet unit 14 permeates the interior of the turbulence box 42, whereby oil that enters the turbulence box 42 is subjected to the internal magnetic flux field. Inside the turbulence box 42, the oil flows in a turbulent manner, as opposed to a smooth, laminar manner. As a result, the turbulently flowing oil in the turbulence box 42 resides in the turbulence box 42 for a relatively long time, and the oil is exposed to the internal magnetic flux field for a relatively long time. Consequently, an enhanced amount of magnetically attracted particles are moved from the oil and are held by magnetic attraction on the inside housing wall adjacent to the magnet unit 14.

After magnetic treatment inside the turbulence box 42, the magnetic-flux-treated oil exits from the turbulence box 42 through the first turbulence flow orifices 56 and the second turbulence flow orifices 58. The magnetic-flux-treated oil then passes through the filter unit 16, which is a conventional filter unit, and exits out from the cartridge housing 12 through the cartridge mounting stem 27. In this respect, the turbulence box 42 and the internal magnetic flux field from the magnet unit 14 provide a pre-filtration magnetic treatment zone for the oil. Alternatively, if desired, the turbulence box 42 and the internal magnetic flux field could be positioned with respect to oil flow to provide a post-filtration magnetic treatment zone.

In a second manner of use of the magnetically enhanced oil filter apparatus of the invention, the apparatus is assembled whereby, on the outside of the cartridge housing 12, the magnet unit 14 is connected to the cartridge housing 12 using a mounting strap or straps such as shown in above-mentioned U.S. Pat. No. 5,510,024, incorporated herein by reference. As background, there may be engine or peripheral components that prevent the cartridge housing 12 from being screwed onto the cartridge mounting stem 27 if the magnet unit 14 is fixed to the cartridge housing 12 by first magnet unit mounting brackets 18 and mounting tabs 28.

Such an installation problem can be avoided by using a magnet unit 14 that is connected to the cartridge housing 12 using a mounting strap, such as shown in above-mentioned U.S. Pat. No. 5,510,024. The strap can be loosened, the magnet unit 14 can be removed from the cartridge housing 12, and the cartridge housing 12 can be screwed onto the cartridge mounting stem 27 in an unobstructed manner. Then, the magnet unit 14 is positioned on the side of the cartridge housing 12 in a convenient. location on the outside housing wall. Then, marks are made on the outside housing wall to outline the convenient location of the magnet unit 14. Then, the magnet unit 14 is removed from the cartridge housing 12, and the cartridge housing 12 is unscrewed from the cartridge mounting stem 27.

Figure 2:
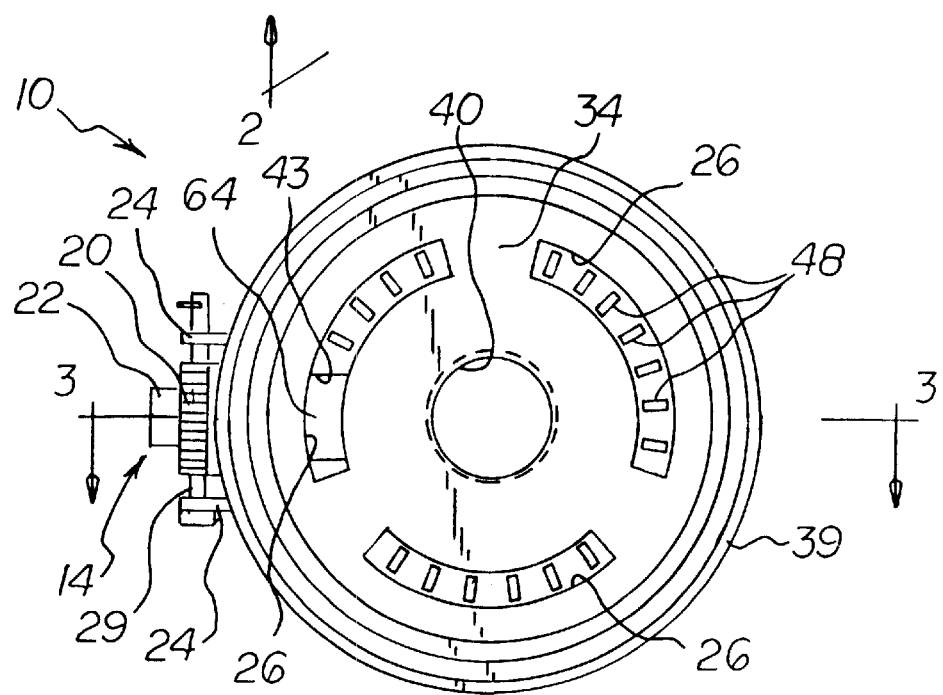
FIG. 2 is a bottom view of the embodiment of the magnetically enhanced oil filter apparatus shown in FIG. 1 taken along line 2—2 of FIG. 1.

With the magnetically enhanced oil filter apparatus 10 removed from the cartridge mounting stem 27 and the engine, the user grasps the cartridge housing 12 and holds the cartridge housing 12 so that the user can observe both the marked outline of the convenient location of the magnet unit 14 on the outside housing wall and the location of the box roof panel 64 of the turbulence box 42 inside the cartridge housing 12, as shown in FIG. 2. The user can see the location of the box roof panel 64 of the turbulence box 42 inside the cartridge housing 12 through the cartridge oil input channel slots 26 in the housing mounting plate 34.

If the box roof panel 64 is not in registration with the convenient location of the magnet unit 14 on the outside housing wall, the user can use a screwdriver (not shown) and place the blade of the screwdriver in one of the adjustment-tool-reception notches 48 in the turbulence box support plate 44. Then, the user pushes the turbulence box support plate 44 so that it rotates inside the cartridge housing 12 to place the box roof panel 64 in registration with the convenient location of the magnet unit 14 on the outside housing wall. As a result, the turbulence box 42 is in registration with the convenient location of the magnet unit 14 on the outside housing wall. It is noted that when the turbulence box support plate 44 is rotated by the screwdriver, the support-plate-reception gasket 50 slides along the inside housing wall.

Then, the cartridge housing 12 is screwed back on the cartridge mounting stem 27. Then, the magnet unit 14 is placed on the convenient location on the outside housing wall, and the mounting strap is tightened to securely fix the magnet unit 14 to the cartridge housing 12.

Once the magnet unit 14 is re-installed and secured on the cartridge housing 12, the internal filtering operation of the magnetically enhanced oil filter apparatus 10 operates as described above.

The components of the magnetically enhanced oil filter apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved magnetically enhanced oil filter apparatus that is low in cost, relatively simple in design and operation, and which may advantageously be used to direct a concentrated flow of oil inside the oil filter cartridge in the vicinity of a magnet attachment. With the invention, a magnetically enhanced oil filter apparatus is provided which enables an easy registration adjustment of an internal flow director with an external magnet unit. With the invention, a magnetically enhanced oil filter apparatus is provided which include elements that increase the exposure of the oil flowing in the oil filter cartridge to the magnetic flux field exerted by the magnet unit on the flowing oil. With the invention, a magnetically enhanced oil filter apparatus is provided which causes a turbulent flow of the oil through the magnetic flux field exerted by a magnet unit.

Thus, while the present invention has been shown in the drawings and fully described above with particularity and detail in connection with what is presently deemed to be the most practical and preferred embodiment(s) of the invention, it will be apparent to those of ordinary skill in the art that many modifications 10 thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. A magnetically enhanced oil filter apparatus for attachment to a cartridge mounting stem on an engine, comprising:
    a cartridge housing which includes an inside housing wall and an outside housing wall,
    a magnet unit supported on a portion of said outside housing wall, wherein said magnet unit provides a magnetic flux field, a portion of which is present inside said cartridge housing defining an internal magnetic flux field,
    a turbulence box support plate supported inside said cartridge housing, wherein said turbulence box support plate includes a box-reception notch,
    a filter unit supported on said turbulence box support plate, and
    a turbulence box supported by said turbulence box support plate adjacent to a portion of said inside housing wall, wherein said turbulence box is placed in registration with said box-reception notch, and wherein said turbulence box is placed in registration with said internal magnetic flux field.

2. The apparatus of claim 1 wherein said magnet unit includes:
    a heat sink portion,
    cylindrical magnets received in said heat sink portion,
    a magnet concentrator plate contacting said heat sink portion and placed in registration with said cylindrical magnets, and
    unit-to-cartridge-housing connector means, connected to said heat sink portion, for connecting said magnet unit to said cartridge housing.

3. The apparatus of claim 2 wherein said unit-to-cartridge-housing connector means include:
    first magnet unit mounting brackets attached to said outside housing wall,
    second magnet unit mounting brackets which include bottom mounting tabs and top pin-reception portions, wherein said mounting tabs are received in said first magnet unit mounting brackets, and
    a mounting pin threaded through said pin-reception portions.

4. The apparatus of claim 1 wherein:
    said turbulence box support plate is received in a support-plate-reception gasket which forms a partial seal between said turbulence box support plate and said inside housing wall, and
    said support-plate-reception gasket includes a gasket gap which is in registration with said turbulence box.

5. The apparatus of claim 4 wherein said turbulence box support plate is received in a plate-reception groove in said support-plate-reception gasket.

6. The apparatus of claim 1 wherein said turbulence box support plate includes an internally threaded support-plate-stem-reception channel for attachment to an externally threaded cartridge mounting stem.

7. The apparatus of claim 1, further including:
    a housing mounting plate connected to said cartridge housing, wherein said housing mounting plate includes an internally threaded mounting-plate-stem-reception channel for attachment to an externally threaded cartridge mounting stem, and wherein said housing mounting plate includes cartridge oil input channel slots.

8. The apparatus of claim 7 wherein said housing mounting plate includes a mounting plate lip, and wherein said cartridge housing includes a housing bottom lip, further including:
    a lip-to-lip gasket between said mounting plate lip and said housing bottom lip, and
    a lip-gasket-lip clamping member for clamping said lip-to-lip gasket between said mounting plate lip and said housing bottom lip.

9. The apparatus of claim 1 wherein said turbulence box support plate includes adjustment-tool-reception notches which are in registration with said cartridge oil input channel slots.

10. The apparatus of claim 1 wherein said turbulence box includes:
    box side wall panels connected to said turbulence box support plate along side said box-reception notch, and
    a box roof panel connected to top portions of said box side wall panels,
    wherein said box side wall panels include turbulence flow orifices.

11. The apparatus of claim 10 wherein said turbulence flow orifices include first turbulence flow orifices and second turbulence flow orifices.

12. The apparatus of claim 11 wherein said second turbulence flow orifices are smaller than said first turbulence flow orifices, wherein said turbulence flow orifices cause enhanced turbulent flow inside said turbulence box, such that oil is retained inside said turbulence box for a relatively long period of time.

13. The apparatus of claim 12 wherein the cross-sectional area of said first turbulence flow orifices and said second turbulence flow orifices is substantially equal to the cross-sectional area of the cartridge mounting stem.

14. The apparatus of claim 1 wherein said turbulence box is formed from a turbulence box blank which includes:
- a box roof panel,
- a rear wall panel connected to said box roof panel at a fold line,
- a pair of box side wall panels connected to said rear wall panel at a respective pair of fold lines, wherein each of said box side wall panels includes first turbulence flow orifices and second turbulence flow orifices, and
- box-to-plate connector means, connected to said box side wall panels and said rear wall panel, for connecting said turbulence box to said turbulence box support plate.

15. The apparatus of claim 14 wherein said box-to-plate connector means include:
- a pair of box locking side tabs connected to each box side wall panel at respective fold lines, and
- a box locking rear tab connected to said rear wall panel at a fold line.

* * * * *